US012652514B2

(12) United States Patent
Kim

(10) Patent No.: US 12,652,514 B2
(45) Date of Patent: Jun. 9, 2026

(54) APPARATUS FOR VEHICLE EMERGENCY CALL AND METHOD FOR THE SAME

(71) Applicant: HYUNDAI MOBIS CO., LTD., Seoul (KR)

(72) Inventor: Seung Hwan Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 446 days.

(21) Appl. No.: 18/063,522

(22) Filed: Dec. 8, 2022

(65) Prior Publication Data

US 2023/0269570 A1     Aug. 24, 2023

(30) Foreign Application Priority Data

Feb. 22, 2022     (KR) ........................ 10-2022-0023148

(51) Int. Cl.
H04W 4/90         (2018.01)
H04W 4/40         (2018.01)

(52) U.S. Cl.
CPC .............. H04W 4/90 (2018.02); H04W 4/40 (2018.02)

(58) Field of Classification Search
CPC .................................. H04W 4/90; H04W 4/40
USPC ...................................................... 455/404.1
See application file for complete search history.

(56) References Cited

U.S. PATENT DOCUMENTS

| | | | | |
|---|---|---|---|---|
| 2003/0191568 A1* | 10/2003 | Breed | .................... | B60W 40/06 |
| | | | | 701/469 |
| 2005/0134440 A1* | 6/2005 | Breed | .................... | G08G 1/161 |
| | | | | 701/45 |
| 2023/0030348 A1* | 2/2023 | Nakagawa | ............. | G08B 25/04 |

FOREIGN PATENT DOCUMENTS

| | | | | |
|---|---|---|---|---|
| KR | 10-0410771 B1 * | 12/2003 | .............. | G08G 1/09 |
| KR | 10-1536872 | 7/2015 | | |
| KR | 2016-0067550 | 6/2016 | | |
| KR | 2017-0055178 | 5/2017 | | |
| WO | WO-2013115929 A2 * | 8/2013 | .......... | A01B 69/007 |

OTHER PUBLICATIONS

Dahlberg, "A Method Determining the Dynamic Rollover Theshold of Commercial Vehicles", SAE Transactions, 2000 https://www.jstor.org/stable/44650818 (Year: 2000).*
Kim, English Machine Translation—KR100410771B1—Description (Published Apr. 26, 2003) (Year: 2003).*
Acharya et al., "A Mobile System for Detecting and Notifying Vehicle Rollover Events", 15th Int. Conf. on Advanced Computing and Comm., 2007 IEEE https://ieeexplore.ieee.org/stamp/stamp.jsp?tp=&arnumber=4425983 (Year: 2007).*

(Continued)

*Primary Examiner* — Rafael Pérez-Gutiérrez
*Assistant Examiner* — Aaron C. Deditch
(74) *Attorney, Agent, or Firm* — DLA PIPER US

(57) ABSTRACT

An apparatus for a vehicle emergency call that makes an emergency call when a vehicle is rolled over. The apparatus for a vehicle emergency call includes: a longitude and latitude calculation unit configured to calculate longitude and latitude values of a positioning sensor; an altitude calculation unit configured to calculate a measured altitude; a rollover determination unit configured to determine whether the vehicle is rolled over; and a communication unit transmitting an emergency call message to an emergency rescue center.

13 Claims, 4 Drawing Sheets

(56) References Cited

OTHER PUBLICATIONS

Rajamani et al., "Parameter and State Estimation in Vehicle Roll Dynamics", IEEE Transactions on Intelligent Transportation Systems, vol. 12, No. 4, Dec. 2011 https://people.isy.liu.se/fs/frisk/tmp/iQDrive_Articles/Parameter%20and%20State%20Estimation%20in%20Vehicle%20Roll%20Dynamics.pdf (Year: 2011).*

Chu et al., A Novel Rollover Warning Method for Ground Vehicles Based on Smartphone Built in GIS/GPS, The 3rd International Conference on Transportation Information and Safety, Jun. 25, 2015 https://www.researchgate.net/publication/338464410 (Year: 2015).*

Min et al., English Machine Translation—KR20170055178A—Description (May 19, 2017) (Year: 2017).*

Majors, "New Tool shows Elevations on Google Maps, all over the world", Jan. 28, 2021 https://www.randymajors.org/2019/08/new-tool-shows-elevations-on-google (Year: 2021).*

English Language Abstract of KR 10-1536872 published Jul. 14, 2015.

English Language Abstract of KR 2016-0067550 published Jun. 14, 2016.

English Language Abstract of KR 2017-0055178 published May 19, 2017.

* cited by examiner

ALTITUDE
CALCULATION UNIT
(IN GPS SENSOR 2)
$(x2, y2, z2)$

ALTITUDE
CALCULATION UNIT
(IN GPS SENSOR 1)
$(x1, y1, z1)$

ALTITUDE VALUE IN
ROLLOVER STATE
$z1 < z2, \mid z1-z2 \mid = h3$

ALTITUDE
CALCULATION UNIT
(IN GPS SENSOR 1)
$(x1, y1, z1)$ $h4$ $h3$

ALTITUDE
CALCULATION UNIT
(IN GPS SENSOR 2)
$(x2, y2, z2)$

ALTITUDE VALUE IN
NORMAL STATE
$z1 > z2, \mid z1-z2 \mid = h3$

APPARATUS FOR VEHICLE EMERGENCY CALL AND METHOD FOR THE SAME

CROSS-REFERENCE TO RELATED APPLICATION

This application claims priority to and the benefit of Korean Patent Application No. 10-2022-0023148, filed on Feb. 22, 2022, the disclosure of which is incorporated herein by reference in its entirety.

BACKGROUND

Technical Field

The present disclosure relates to an apparatus for a vehicle emergency call and a method for the same, and more particularly, to an apparatus for a vehicle emergency call in a vehicle rollover accident, and a method for the same.

Related Art

A driver's safety is a very important matter in a vehicle. In recent years, a vehicle mounted with an apparatus for an emergency call that makes the emergency call has thus been popular so that a vehicle accident report and a relief request are made from the vehicle for a rapid rescue even in a situation where the driver loses his or her consciousness or cannot make a phone call when the vehicle accident occurs. Basically, the apparatus for an emergency call may be automatically activated to make the emergency call for reporting the accident when a sensor mounted in the vehicle detects a serious collision.

A conventional apparatus for an emergency call may determine whether to make the emergency call based on whether an airbag mounted in the vehicle is operated. That is, when there occurs an impact enough to operate the airbag, the apparatus for a vehicle emergency call may determine that the driver cannot normally report the accident, and automatically make the emergency call. However, the conventional apparatus for an emergency call may not be mounted with the airbag or its airbag device may not be operated due to malfunction or other reasons. In this case, the apparatus is unable to automatically make the emergency call even when a serious accident occurs, such as when the vehicle is rolled over.

SUMMARY

Various embodiments are directed to providing an apparatus for an emergency call that makes the emergency call even in a vehicle rollover accident where an airbag is not operated, unlike a conventional apparatus for an emergency call, and a method for the same.

Various other embodiments are directed to providing an apparatus for an emergency call that makes the emergency call by using a sensor basically installed on a vehicle without any additional sensor, and a method for the same.

The present disclosure is not limited to the above-mentioned aspects, and other aspects that are not mentioned here may be obviously understood by those skilled in the art from the following specification.

In an embodiment, an apparatus for a vehicle emergency call includes: an altitude calculation unit calculating a measured altitude value that indicates an altitude value of a road on which a vehicle is driven; a longitude and latitude calculation unit calculating longitude and latitude values of the vehicle; and a rollover determination unit determining whether the vehicle is rolled over based on whether the measured altitude value is an altitude value in a normal state or an altitude value in a rollover state when the calculated longitude and latitude values are not changed for a predetermined threshold time or more; and a communication unit transmitting an emergency call message to an emergency rescue center when the vehicle is determined to be rolled over.

In another embodiment, a method for a vehicle emergency call includes: calculating longitude and latitude values of a vehicle; calculating a measured altitude value that is an altitude value of the road on which a vehicle is driven when the calculated longitude and latitude values are not changed for a predetermined threshold time or more; determining whether the vehicle is rolled over based on the measured altitude value; and transmitting an emergency call message to an emergency rescue center when the vehicle is determined to be rolled over.

DETAILED DESCRIPTION

Figure 1:
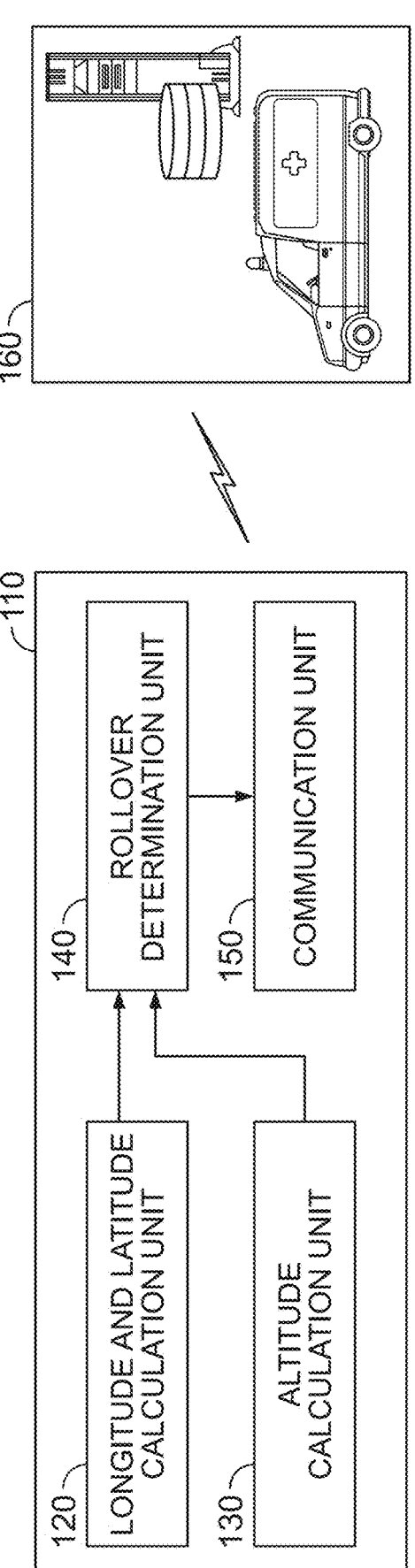
FIG. 1 is a configuration diagram showing an apparatus for a vehicle emergency call according to an embodiment of the present disclosure.

The present disclosure may be variously modified and have various embodiments, and specific embodiments will be shown in the drawings and described in detail in the detailed description. However, it is to be understood that the present disclosure is not limited to the specific embodiments, and includes all changed, modifications, equivalents and/or substitutions, included in the spirit of the present disclosure.

Terms used in the specification, "first," "second" and the like may be used to describe various components, but the components are not to be interpreted to be limited by the terms. The terms are used only to distinguish one component from another component. A term 'and/or' includes a combination of a plurality of related items or any one of the plurality of related items.

It is to be understood that when one component is referred to as being "connected to" or "coupled to" another component, it may be directly connected to or directly coupled to another component, or may be connected to or coupled to another component, having a third component interposed therebetween. On the other hand, it is to be understood that when one component is referred to as being "directly connected to" or "directly coupled to" another component, it may be connected or coupled to another component without the third component interposed therebetween.

Terms used in this application are used only to describe the embodiments disclosed herein rather than limiting the present disclosure. A term of a singular number may include its plural number unless explicitly indicated otherwise in the context. It is to be understood that terms such as "comprise" and "include" used in this specification specify the presence of features, numerals, steps, operations, components, parts or combinations thereof, described in the specification, and do not preclude the presence or addition of other features, numerals, steps, operations, components, parts or combinations thereof.

A term such as "the" and similar referents, used in this application, may refer to both the singular number and the plural number. In addition, unless the description explicitly designates an order of steps for describing a method according to the present disclosure, the described steps may be performed in the order for performing an object of the present disclosure. The present disclosure is not limited by the described order of the described steps.

All terms used in this specification, including technical or scientific terms, have the same meaning as generally understood by those skilled in art to which the present disclosure pertains, and should not be construed as having an ideal or excessively reduced formal meaning, and a term should be interpreted as defined when a meaning of the term is defined in this specification.

Hereinafter, various embodiments of the present disclosure are described in more detail with reference to the accompanying drawings. In order to facilitate the overall understanding of the present disclosure in describing the present disclosure, the same components are denoted by the same reference numerals throughout the accompanying drawings, and a redundant description for the same components is omitted.

The subject matters of the present disclosure are to determine whether a vehicle is rolled over based on the longitude, latitude and altitude values of the vehicle, calculated by a global positioning system (GPS) basically installed on the vehicle, and to automatically make an emergency call to a rescue center or the like when it is determined that the vehicle is rolled over. Here, whether the vehicle is rolled over may be more accurately determined by calculating a corrected altitude value for determining whether the vehicle is rolled over in consideration of an installation height of the GPS system installed on the vehicle. Through this configuration, the emergency call may be quickly made without any separate additional device even in a vehicle rollover accident where an airbag is not deployed.

Hereinafter, embodiments of the present disclosure are described in detail with reference to the accompanying drawings.

FIG. 1 is a configuration diagram showing an apparatus for a vehicle emergency call according to an embodiment of the present disclosure.

Referring to FIG. 1, an apparatus 110 for a vehicle emergency call according to an embodiment of the present disclosure may include a longitude and latitude calculation unit 120 calculating latitude and longitude values of a global positioning system (GPS) receiver of the currently-driven vehicle, an altitude calculation unit 130 calculating a measured altitude value that indicates an altitude value of the GPS receiver, a rollover determination unit 140 determining whether the vehicle is rolled over based on the calculated latitude and longitude values and the measured altitude value, and a communication unit 150 making the emergency call to an emergency rescue center 160 when the vehicle is determined to be rolled over.

The GPS receiver (or GPS chip) may receive GPS signals from four or more GPS satellites located in an earth orbit and check its own three-dimensional spatial coordinates by a triangulation method. The GPS receiver may convert the checked coordinates into its latitude and longitude on the earth based thereon, and output the same. The GPS receiver may also convert the checked coordinates into its height (or altitude) on the earth's geoid and output the same. That is, the longitude and latitude calculation unit 120 and the altitude calculation unit 130 may be included in the GPS receiver. However, the present disclosure is not limited thereto, and may be modified in various ways in such a manner that the GPS receiver only outputs its three-dimensional spatial coordinates, and the longitude and latitude calculation unit 120 and the altitude calculation unit 130 included in the apparatus for a vehicle emergency call of the present disclosure calculate the longitude and latitude and altitude of the GPS receiver, or the GPS receiver outputs its longitude, latitude and altitude, and the longitude and latitude calculation unit 120 and the altitude calculation unit 130 verify the same.

In addition, although the description describes an embodiment based on the GPS system for convenience of explanation and better understanding of the present disclosure, the longitude and latitude values may be calculated using other satellite navigation systems rather than the GPS system.

The rollover determination unit 140 of the apparatus 110 for a vehicle emergency call according to an embodiment of the present disclosure may determine whether the accident occurs by receiving the measured altitude, latitude and longitude values, which are calculated by the altitude calculation unit 130 and the longitude and latitude calculation unit 120.

In detail, the rollover determination unit 140 may determine whether the vehicle is being moved or stationary by checking whether the received longitude and latitude values are changed for a predetermined threshold time or more. The rollover determination unit 140 may not make any additional determination by considering that there occurs no accident while the vehicle is continuously moved. However, it may represent that the accident occurs while the vehicle is driven, when the vehicle is determined to be stationary as the longitude and latitude values are not changed for the predetermined threshold time or more. In this case, the rollover determination unit 140 may determine whether the measured altitude value received from the altitude calculation unit 130 is an altitude value in a normal state or an altitude value in a rollover state.

Figure 2:
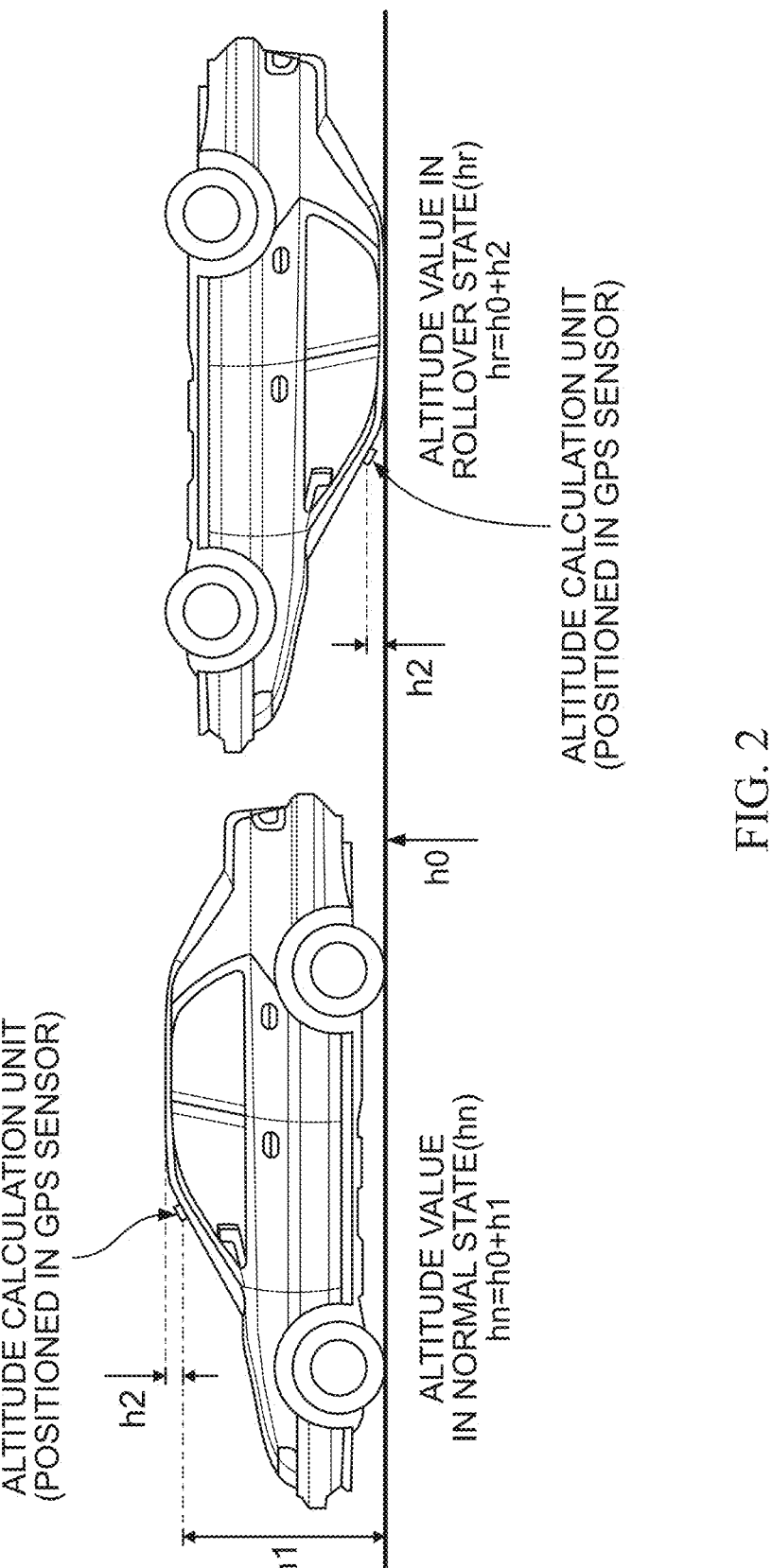
FIG. 2 is a conceptual diagram showing a method of calculating an altitude value of a vehicle when the vehicle is normally driven or rolled over by the apparatus for a vehicle emergency call according to an embodiment of the present disclosure.

An altitude value (hn) in a normal state may refer to a corrected altitude value obtained while the vehicle is normally driven as shown in FIG. 2, and be the sum of an altitude value (h0) of the ground, corresponding to the calculated longitude and latitude values, and a height (h1) of the GPS receiver installed on the vehicle to the lowest point of a vehicle tire.

The altitude value (h0) of the ground, corresponding to the calculated longitude value and latitude value, may be confirmed by referring to the altitude value shown on a navigation map mounted in the vehicle. Alternatively, the altitude value h0 may be confirmed by referring to another map (e.g., precision map). The height (h1) of the GPS receiver to the lowest point of the tire may have a value pre-stored in the rollover determination unit 140 as a value determined when the GPS receiver is designed or an already-fixed value determined when the GPS receiver is installed.

The altitude of the GPS receiver, that is, the altitude value obtained by the altitude calculation unit 130, may be substantially equal to the altitude value (hn=h0+h1) in a normal state when the vehicle is in a normal state where the vehicle is not rolled over. Therefore, the rollover determination unit 140 may determine whether the vehicle is in the normal state by checking whether the measured altitude value output by the altitude calculation unit 130 and the altitude value (hn) in a normal state are equal to each other. Here, determination logic may determine that the vehicle is in the normal state when an error between the measured altitude value and the altitude value in a normal state occurs within a predetermined range (e.g., about 60 cm which is 30% of h1) in consideration of an error of the GPS receiver and a change in a terrain (such as a puddle or a low hill that is recently created after the map is produced).

An altitude value (hr) in a rollover state may refer to a corrected altitude value obtained when the vehicle is rolled over as shown in FIG. 2, and be the sum of the altitude value (h0) obtained by referring to the map, corresponding to the calculated longitude and latitude values and a height (h2) of the altitude calculation unit to the ground when the vehicle is rolled over. The height (h2) may be a distance difference between the GPS receiver installed on the vehicle and the highest portion of a vehicle ceiling, and have a value pre-stored in the rollover determination unit 140 as a value determined when the GPS receiver is designed or an already-fixed value determined when the GPS receiver is installed. The measured altitude value may be equal to the altitude value (hr=h0+h2) in a rollover state when the vehicle is rolled over.

Therefore, the rollover determination unit 140 may determine whether the vehicle is in the rollover state by checking whether the measured altitude value output by the altitude calculation unit 130 and the altitude value (hr) in a rollover state are equal to each other. Here, the determination logic may determine that the vehicle is in the rollover state when an error between the measured altitude value and the altitude value in a rollover state occurs within a predetermined range (e.g., 30% of h2) in consideration of an error of the GPS receiver and a change in the terrain (such as a puddle or a low hill that is recently created after the map is produced).

In summary, the rollover determination unit 140 may determine that the vehicle is rolled over when the calculated longitude and latitude values are not changed for the above-mentioned threshold time or more, and the measured altitude value at the current latitude and longitude is determined to be the altitude value in a rollover state rather than the altitude value in a normal state. Here, to calculate the measured altitude value as the altitude value in a rollover state may indicate that the measured altitude value is calculated as the altitude value in a rollover state when a difference between the measured altitude value and the altitude value in a rollover state is within the predetermined error range. In this case, the predetermined error range may depend on implementation of the apparatus for a vehicle emergency call according to an embodiment of the present disclosure (Similarly, to determine the measured altitude value as the altitude value in a normal state may indicate that the difference between the measured altitude value and the altitude value in a normal state is within the predetermined error range).

In this way, the apparatus may automatically make the emergency call without adding a sensor even when the airbag malfunctions.

The rollover determination unit 140 may request the communication unit 150 of the apparatus 110 for a vehicle emergency call according to an embodiment of the present disclosure to transmit an emergency call message when the measured altitude value is determined as the altitude value in a rollover state. The emergency call message may include information on current longitude, latitude and altitude values of the vehicle, and may further include information on a vehicle model and a vehicle identification number.

The emergency rescue center 160 receiving the emergency call message may dispatch a rescue vehicle to an accident location after identifying the accident location by using the longitude and latitude values and measured altitude value on the emergency call message.

Meanwhile, a positioning system such as the GPS may have an error of tens of cm to 1 m due to an external factor such as a climate or the terrain, and the measured value may be changed over time when the vehicle is stationary. Therefore, required is an additional verification process to increase reliability of the rollover determination.

As an example of a verification method in the process, the rollover determination unit 140 may first perform a process of determining a feature of the terrain to which the latitude and longitude measured on the map belong, rather than directly comparing the measured altitude value with the corrected altitude value, and then perform the altitude value comparison by reflecting the corresponding feature of the terrain to determine the altitude value when the longitude and latitude values measured by the longitude and latitude calculation unit 120 are not changed for a predetermined time or more. For example, the rollover determination unit 140 may lower a standard for determining the normal state (by increasing a margin of the altitude value in a normal state and decreasing a margin of the altitude value in a rollover state) when there is a high probability that the vehicle is normally parked as the vehicle is located in a parking lot, rest stop, or a resting place for drowsiness. On the other hand, the rollover determination unit 140 may lower a standard for determining the rollover state (by decreasing a margin of the altitude value in a normal state and increasing a margin of the altitude value in a rollover state) when the longitude and latitude values measured on a road, a paddy field beside the road or the like are not changed for the predetermined time. The rollover determination unit 140 may check the feature of the terrain to which the measured longitude and latitude belong on the navigation map.

As another example of the verification method, the rollover determination unit 140 may first determine whether the vehicle is rolled over by comparing the measured altitude value and the corrected altitude value with each other, and then consider the feature of the terrain to which the corresponding latitude and longitude belong to finally determine whether the vehicle is rolled over. For example, the rollover determination unit 140 may first determine that the vehicle is in the rollover state by performing the altitude value comparison, and then consider that the first determination is incorrect because an error occurs in the altitude value comparison due to the error of the GPS receiver to finally determine that the vehicle is in the normal state when the vehicle is located in a parking lot or a rest area as a result of checking the feature of the terrain to which the corresponding latitude and longitude belong.

As still another example of the verification method, the rollover determination unit 140 may repeatedly perform the altitude value comparison several times for a predetermined period (e.g., 10 times per minute) rather than performing the comparison only once, and then finally determine that the vehicle is in the rollover state when the rollover state is determined by a predetermined ratio (e.g., ratio of 80%) or more. The error of the GPS receiver may be greater when the vehicle is stationary than while the vehicle is moved, and a probability of the incorrect determination made due to the error of the GPS receiver may thus be reduced when a statistical analysis is achieved by repeatedly performing the altitude value comparison several times for the predetermined period.

As yet another example of the verification method, the rollover determination unit 140 may continuously store the past longitude, latitude and altitude data of a first predetermined time (e.g., 30 seconds or 1 minute before the vehicle is stopped) while the vehicle is moved. Here, the vehicle may be determined to be stationary because the longitude and latitude values are not changed for a second predetermined time (e.g., 1 minute) or more. In this case, the rollover determination unit 140 may analyze a movement feature of the vehicle, obtained before the vehicle is stopped, based on the longitude and latitude data obtained before performing the altitude value comparison, thereby determining that the vehicle is in the normal state without performing the altitude value comparison when the vehicle is normally stationary (e.g., the vehicle is stopped by slowing down its speed), and determining whether the vehicle is in the rollover state by performing the altitude value comparison when an accident feature appears as an analysis result of the longitude and latitude data (e.g., the vehicle is suddenly stopped while being driven at a speed of 60 km/h). Alternatively, the rollover determination unit 140 may make a first determination that the vehicle is in the normal state or the rollover state based on the altitude value comparison, and then make a final determination in consideration of the movement feature of the vehicle just before the vehicle is stopped.

The rollover determination unit 140 may consider the altitude value together in determining the movement feature of the vehicle. For example, when the vehicle rollover accident occurs, a sudden change in the measured altitude value may occur due to rotation of the vehicle. This change may occur in a case where the vehicle is being moved, and the measurement error of the GPS receiver may thus be less than the measurement error occurring in a case where the vehicle is stationary. It is thus highly likely that the rollover determination unit 140 accurately identifies such a rotation situation of the vehicle. Therefore, the rollover determination unit 140 may further reduce the possibility of the incorrect determination made due to the measurement error of the GPS receiver by determining the movement feature of the vehicle in consideration of the change in the measured altitude value, and considering the movement feature of the vehicle together in making the determination based on the above-mentioned altitude value comparison.

In particular, the vehicle may be overturned and rolled over actually with a 100% chance when only the altitude value is rapidly changed while the longitude and latitude values are evenly calculated without any deviation on a movement path of the vehicle in a specific direction for a third predetermined time (e.g., 10 seconds) just before the vehicle is stopped. The reason is that it is extremely unlikely that only the altitude value is rapidly changed while the longitude value and latitude value are stably tracked even when the error occurs in the GPS receiver.

The rollover determination unit 140 may make the determination based on various combinations of the above-listed verification methods. That is, the rollover determination unit 140 may increase the reliability of its determination or perform the verification after the determination by using all or some of the following processes combined with each other, or by mixing the combination of these processes with the altitude value comparison which is a basic configuration of the present disclosure, the following processes including: the movement feature of the vehicle determined based on the measured longitude and latitude values just before the vehicle is stopped, the checked change in the altitude value measured just before the vehicle is stopped, the feature of the terrain (e.g., parking lot or road) to which a current location of the vehicle belongs, and the repetitive altitude value comparison. Alternatively, the rollover determination unit 140 may determine that the vehicle is in the rollover state by using one of the methods of each example described above.

Figure 3:
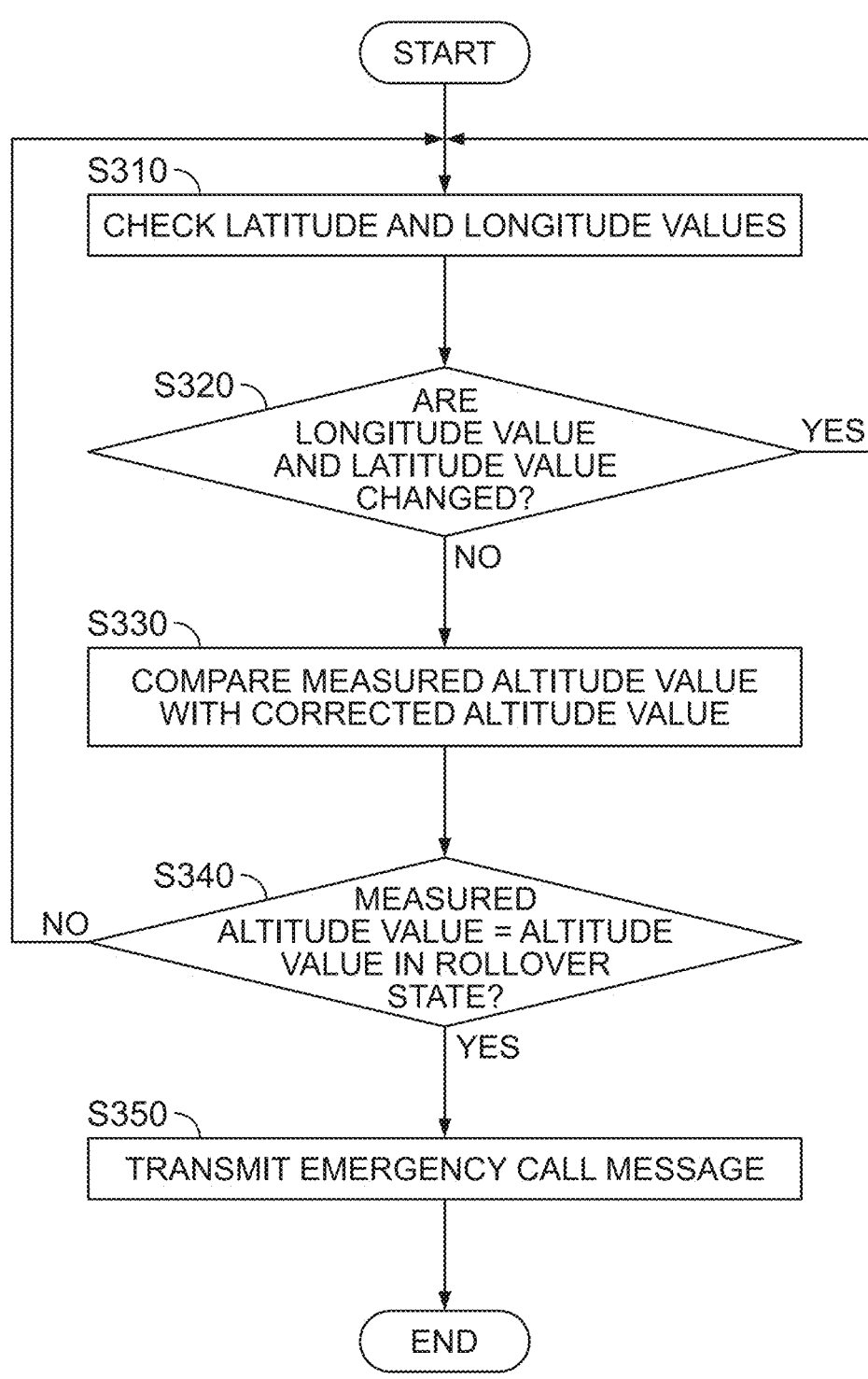
FIG. 3 is a flowchart showing a method for a vehicle emergency call according to another embodiment of the present disclosure.

FIG. 3 is a flowchart showing a method for a vehicle emergency call according to another embodiment of the present disclosure.

A rollover determination unit 140 may check latitude and longitude values of a vehicle while the vehicle is driven, calculated by a longitude and latitude calculation unit 120 of the vehicle (S310), and determine whether the longitude value and the latitude value are not changed for a predetermined threshold time or more (S320).

When the calculated longitude value or latitude value is not changed for the predetermined threshold time or more (No in S320), the rollover determination unit 140 may compare the measured altitude value, which is calculated by the altitude calculation unit 130, with a corrected altitude value (S330). On the other hand, when the calculated longitude value and latitude value are changed (Yes in S320), the rollover determination unit 140 may return to step S310 and continuously check the longitude and latitude values (S310).

As a result of the comparison, the rollover determination unit 140 may determine whether the measured altitude value is an altitude value in a rollover state (S340). As described above, the altitude value in a rollover state may be calculated using a method of calculating the corrected altitude value according to an embodiment of the present disclosure as shown in FIG. 2, in consideration of a relative distance (h1) between a global positioning system (GPS) receiver installed on the vehicle and the highest portion of a vehicle ceiling.

Then, when the altitude value in a rollover state is determined to be substantially equal to the measured altitude value, which is calculated at the current latitude and longitude, while the longitude value and latitude value are not changed for the above-described threshold time or more (Yes in S340), the rollover determination unit 140 may determine that the vehicle is rolled over and a communication unit 150 may transmit an emergency call message (S350). Here, to determine the measured altitude value as the altitude value in a rollover state may indicate that the measured altitude value is determined as the altitude value in a rollover state when a difference between the measured altitude value and the altitude value in a rollover state is within a predetermined error range. As described above, the emergency call message may include information on current longitude, latitude and altitude values of the vehicle, and may further include information on a vehicle model and a vehicle identification number.

On the other hand, when the rollover determination unit 140 determines the measured altitude value, which is calculated at the current latitude and longitude, as an altitude value in a normal state rather than the altitude value in a rollover state (No in S340), the rollover determination unit 140 may return to step S310 to check the longitude and latitude values again.

According to some examples of an embodiment of the present disclosure described above, the apparatus for a vehicle emergency call may check whether the vehicle is rolled over with high reliability and make the emergency call by using the GPS receiver and a navigation map, installed at the vehicle without any additional sensor even when an airbag or another collision detection sensor fails.

Figure 4:
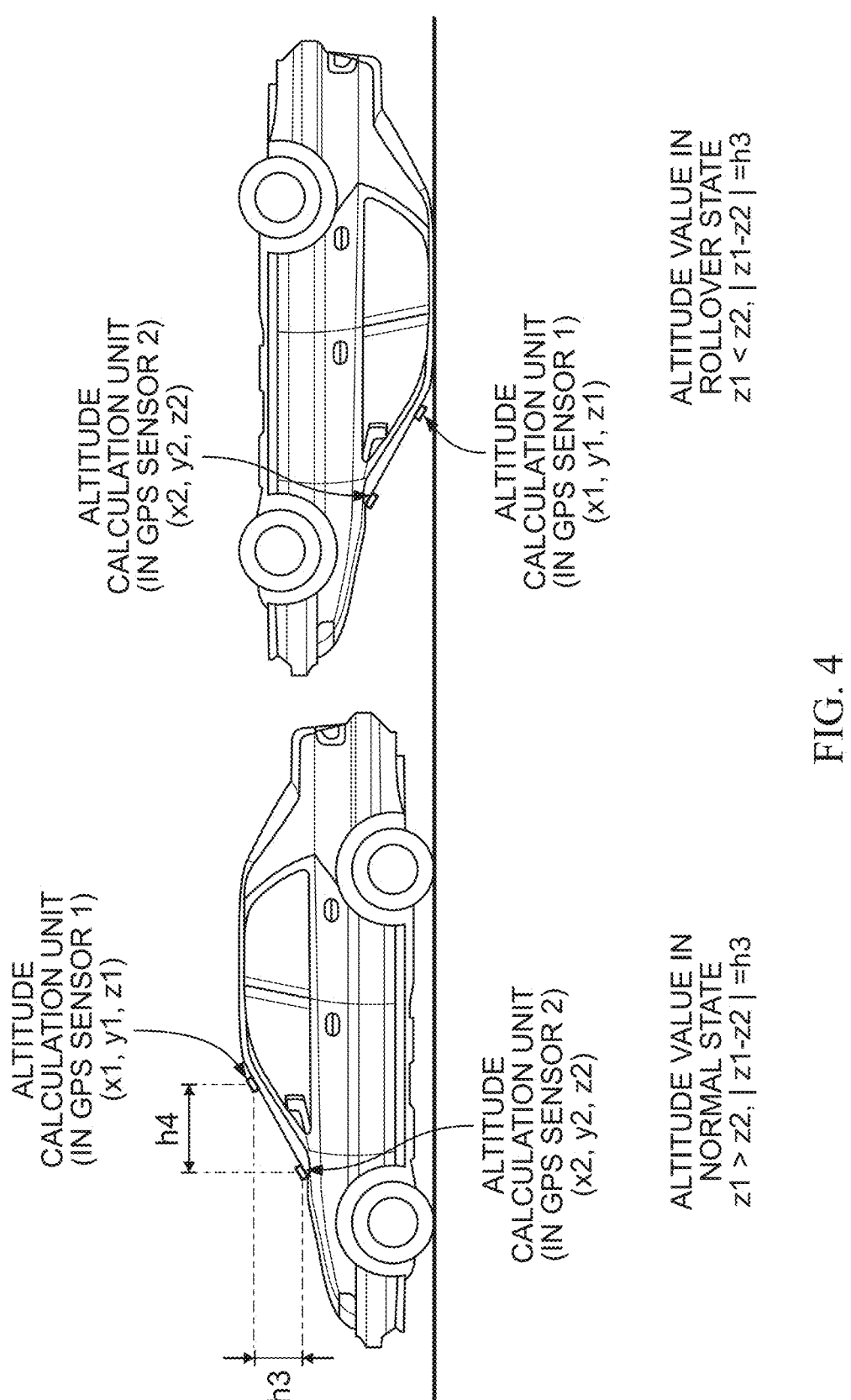
FIG. 4 is a configuration diagram of a method for a vehicle emergency call according to still another embodiment of the present disclosure.

Hereinafter, the description describes an apparatus for a vehicle emergency call according to still another embodiment which may further reduce a possibility of an incorrect determination made due to a measurement error of a global positioning system (GPS) receiver. As shown in FIG. 4, the apparatus may use a method of determining whether a vehicle is rolled over by using two GPS sensors, that is, by adding another GPS sensor to one GPS sensor.

A GPS sensor 1 may be basically installed on the vehicle, and a GPS sensor 2 may be an additional GPS receiver to reduce or eliminate the possibility of the incorrect determination made due to the measurement error of the GPS sensor 1.

The GPS sensor 1 may receive signals from 4 or more GPS satellites in an earth orbit and obtain its three-dimensional (3D) spatial coordinates (x1, y1 and z1) by a triangulation method. The GPS sensor 2 may also obtain its 3D spatial coordinates (x2, y2 and z2).

The GPS sensor 1 and the GPS sensor 2 may be installed to be vertically spaced apart from each other by a predetermined distance (h3) (see FIG. 4). When the GPS sensors are installed as shown in FIG. 4, a first altitude value (z1) may be greater than a second altitude value (z2) in a normal state, and the first altitude value (z1) may be less than the second altitude value (z2) in a rollover state. Accordingly, a rollover determination unit 140 may determine whether the vehicle is rolled over by checking a relative value of the first altitude value (z1) and the second altitude value (z2) when the vehicle is determined to be stationary because the longitude and latitude values of the vehicle are not changed for a predetermined time or more while the vehicle is moved. The GPS receivers installed on a small area in the vehicle may be equally affected by sequence, terrain, and noise, and the relative value of the first altitude value (z1) and the second altitude value (z2) may thus remain the same even when the measurement error of the GPS receiver occurs. Therefore, the rollover determination unit 140 may determine whether the vehicle is rolled over with higher reliability.

In order to further increase the reliability, the rollover determination unit 140 may further perform a verification process provided to confirm whether the difference between the first altitude value (z1) and the second altitude value (z2) is substantially equal to the predetermined distance (h3). In addition, the rollover determination unit 140 may further increase the reliability by checking coordinates of (x1 and y1) and coordinates of (x2 and y2) to confirm whether a vector distance between the coordinates of (x1, y1) and the coordinates of (x2, y2) is substantially the same as the predetermined distance (h3).

Meanwhile, still another embodiment of FIG. 4 may be implemented by being integrated with the embodiments of FIGS. 1 to 3. For example, the rollover determination unit 140 may determine whether the vehicle is rolled over with the higher reliability by obtaining a measured altitude value by using the GPS sensor 1, determining whether the vehicle is rolled over based on comparison of the measured altitude value and a corrected altitude value (i.e., altitude value in a normal state or altitude value in a rollover state), and by supplementarily examining whether the difference (z1-z2) between the altitude values of the GPS sensors 1 and 2 is inverted (e.g., from positive to negative number or from negative to positive number) together.

The above embodiments may be implemented using various types of computer means including one or more processors, memories, and storage units. The computer means may further include a network interface connected to a wired or wireless network. The processor may be a central processing unit or a semiconductor device that executes processing instructions stored in the memory and/or the storage unit. The memory or the storage unit may include a volatile storage medium or a non-volatile storage medium. For example, the memory may include a read only memory (ROM) and a random access memory (RAM). Accordingly, the embodiments of the present disclosure may be implemented by a computer-implemented method or as a non-transitory computer-readable medium having computer-executable instructions stored in the computer. In the embodiments of the present disclosure, when executed by the processor, the computer-readable instructions may perform the method according to at least one aspect of the present disclosure.

According to an aspect of the present disclosure, it is possible to take the rapid relief measures by the emergency call made for reporting the accident even when the vehicle is rolled over and the airbag is not operated.

Furthermore, according to an aspect of the present disclosure, there is no need for any additional sensor, and the emergency call may thus be made without a factor for increasing the cost of the vehicle.

As set forth above, the present disclosure is described in detail with reference to the various embodiments. However, the above-described embodiments are only described by way of examples, and do not limit the scope of the present disclosure. It is expected that those skilled in the art to which the present disclosure pertains may make various modifications and changes within the scope of the present disclosure from the teachings and suggestions of this specification. For example, the longitude and latitude calculation unit 120, the altitude calculation unit 130, or the rollover determination unit 140 may be integrated into one module or divided into two or more devices. Therefore, the scope of the present disclosure is required to be determined by the claims disclosed below.

What is claimed is:

1. An apparatus for a vehicle emergency call, the apparatus comprising:

a processor; and a memory couped to the processor and storing processing instructions, wherein when executing the processing instructions, the processor is configured to:

calculate longitude and latitude values of a positioning sensor installed on a vehicle;

calculate a measured altitude value by using the positioning sensor;

determine whether the calculated longitude and latitude values are not changed for a predetermined threshold time; determine, by comparing the measured altitude value with an altitude value in a rollover state or an altitude value in a normal state, whether the vehicle is rolled over based on whether the measured altitude value is the altitude value in a normal state or the altitude value in a rollover state when the calculated longitude and latitude values are not changed for the predetermined threshold time, wherein the processor is configured to determine that the vehicle is rolled over when a difference between the measured altitude value and the altitude value in a rollover state is equal to or less than a ratio with respect to the altitude value in a rollover state, wherein the positioning sensor includes:

a first positioning sensor installed at an upper end of a vehicle; and a second positioning sensor installed lower than the first positioning sensor; and wherein the processor is further configured to calculate the altitude value in the normal state by summing an altitude value of the ground, corresponding to longitude and latitude values and a height of a positioning sensor to a lowest point of a vehicle tire.

2. The apparatus of claim 1, wherein the processor is futher configured to calculate the altitude value in the rollover state by summing an altitude value of the ground, corresponding to the longitude and latitude values and a height of the positioning sensor to a highest point of a vehicle ceiling.

3. The apparatus of claim 1, wherein the processor is futher configured to extract the altitude value of the ground, corresponding to the longitude and latitude values, from a navigation map.

4. The apparatus of claim 1, wherein the processor is futher configured to determine whether the vehicle is rolled over by further considering a feature of a terrain to which the longitude and latitude values belong.

5. The apparatus of claim 1, wherein the processor is futher configured to determine whether the vehicle is rolled over by further determining a movement pattern of the vehicle, analyzed based on the longitude and latitude values, for a predetermined time before the vehicle is stopped.

6. The apparatus of claim 1, wherein the processor is futher configured to determine whether the vehicle is rolled over by further determining a rotation of the vehicle, analyzed based on the measured altitude value, for a predetermined time before the vehicle is stopped.

7. The apparatus of claim 1, wherein the processor is further configured to transmit an emergency call message to an emergency rescue center when the vehicle is determined to be rolled over.

8. A method for a vehicle emergency call, the method comprising:

calculating longitude and latitude values of a positioning sensor installed on a vehicle;

determining whether the calculated longitude and latitude values are not changed for a predetermined threshold time;

obtaining a measured altitude value that is an altitude value of the positioning sensor when the calculated longitude and latitude values are not changed for the predetermined threshold time;

determining, by performing an altitude value comparison, whether the vehicle is rolled over based on the measured altitude value, including:

determining that the vehicle is rolled over when a difference between the measured altitude value and an altitude value in a rollover state is equal to or less than a ratio with respect to the altitude value in a rollover state; and transmitting an emergency call message to an emergency rescue center when the vehicle is determined to be rolled over, wherein the positioning sensor includes:

a first positioning sensor installed at an upper end of a vehicle; and a second positioning sensor installed lower than the first positioning sensor, wherein determining whether the vehicle is rolled over comprises:

calculating an altitude value in a normal state, which is the altitude value when the vehicle is in a normal state, and the altitude value in a rollover state, which is the altitude value when the vehicle is in a rollover state; and determining whether the vehicle is rolled over by comparing the measured altitude value, the altitude value in a normal state or the altitude value in a rollover state with each other; and wherein the altitude value is calculated in the normal state by summing an altitude value of the ground, corresponding to longitude and latitude values and a height of a positioning sensor to a lowest point of a vehicle tire.

9. The method of claim 8, wherein determining whether the vehicle is rolled over comprises:

continuously storing and managing the longitude and latitude values and the measured altitude value for a first predetermined time; and determining that the vehicle is rolled over by analyzing a movement pattern of the vehicle for the first predetermined time just before the vehicle is stopped when only the altitude value is rapidly changed while the longitude and latitude values are evenly calculated without any deviation on a movement path of the vehicle in a specific direction for a second predetermined time just before the vehicle is stopped in a case where the vehicle is determined to be stationary because the longitude and latitude values are not changed for a third predetermined time.

10. The method of claim 8, further comprising, after the determining, verifying a rollover determination result by using at least one of: a result of analyzing a movement feature of the vehicle based on the longitude and latitude values measured for the predetermined time before the vehicle is stopped, a result of checking a change in the altitude value measured just before the vehicle is stopped, a feature of a terrain to which a current location of the vehicle belongs, and a result of repeatedly performing an altitude value comparison.

11. The method of claim 8, wherein transmitting the emergency call message to the emergency rescue center comprises transmitting the emergency call message including at least one of information on a vehicle model and a vehicle identification number together with current longitude and latitude values of the vehicle.

12. An apparatus for a vehicle emergency call, the apparatus comprising:

a first positioning sensor installed at an upper end of a vehicle;

a second positioning sensor installed lower than the first positioning sensor;

a processor configured to:

determine whether longitude and latitude values are not changed for a predetermined time;

determine whether the vehicle is rolled over by using a first altitude value measured by the first positioning sensor and a second altitude value measured by the second positioning sensor; and transmit an emergency call message to an emergency rescue center when the vehicle is determined to be rolled over, wherein the processor is further configured to determine, by performing altitude value comparison, that the vehicle is rolled over when the first altitude value is less than the second altitude value when the vehicle is determined to be stationary, based on the longitude and the latitude values being not changed for the predetermined time; and wherein the processor is further configured to calculate an altitude value in the normal state by summing an altitude value of the ground, corresponding to longitude and latitude values and a height of a positioning sensor to a lowest point of a vehicle tire.

13. The apparatus of claim 2, wherein the processor is configured to extract the altitude value of the ground, corresponding to the longitude and latitude values, from a navigation map.

* * * * *